R. J. BELER.
IMMERSER FOR FRUIT JARS.
APPLICATION FILED JUNE 14, 1918. RENEWED OCT. 31, 1919.
1,342,321. Patented June 1, 1920.
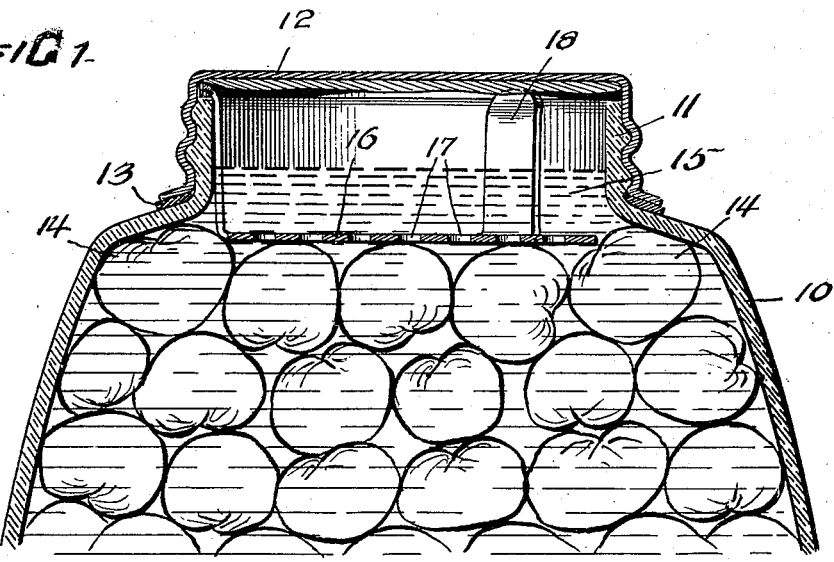
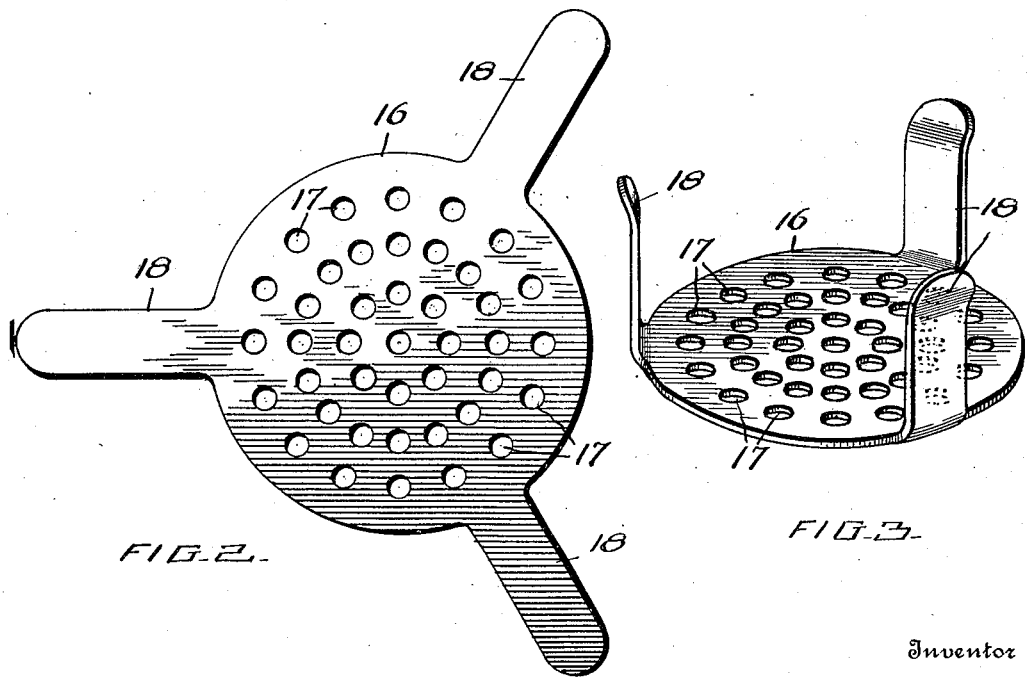
Inventor
Robert J. Beler,
By Daylid Doyle.
Attorney

UNITED STATES PATENT OFFICE.

ROBERT J. BELER, OF SHERIDANVILLE, PENNSYLVANIA.

IMMERSER FOR FRUIT-JARS.

1,342,321.　　　　Specification of Letters Patent.　　Patented June 1, 1920.

Application filed June 14, 1918, Serial No. 239,997. Renewed October 31, 1919. Serial No. 334,882.

*To all whom it may concern:*

Be it known that I, ROBERT J. BELER, a citizen of the United States of America, residing at Sheridanville, in the county of Allegheny, State of Pennsylvania, have invented certain Improvements in Immersers for Fruit-Jars, of which the following is a description, reference being had to the accompanying drawings, forming a part thereof.

My inventon relates to an article of manufacture adapted for use in containers in which fruits or the like are stored and preserved for long periods of time and provides means whereby some of the solids of the contents, that would otherwise float in the liquid with parts thereof exposed above said liquid, and would therefore offer a surface on which mold or the like would form, will be submerged and held in said position when the cap or cover of the receptacle is adjusted into place.

The objects being to provide means of a character that may be used in the ordinary form of fruit jar, without any special construction of jar or cap, and having all the advantages of simplicity, durability, economical construction and also one that may be packed or nested for shipment in a small space.

In the accompanying drawings in which similar numerals indicate corresponding parts in all the figures thereof:—

Figure 1 is a vertical section of the upper portion of a fruit jar illustrating my improved device whereby the fruit is kept immersed in the liquid.

Fig. 2 is a plan view of the device as it will appear if stamped out of sheet metal, prior to the bending up of the arms, and Fig. 3 is a perspective view of the device after the arms are bent into operative position for insertion into the mouth of the fruit jar.

Reference being had to the drawings by numerals 10 indicates the ordinary form of fruit jar having the upper neck portion 11 to receive the usual form of screw cap 12, seated at its lower edge on the rubber gasket 13 resting on the shoulder of the jar. The solids of the contents of the jar are shown at 14 and the liquid above said solid contents is shown at 15. All of these parts are shown merely to illustrate the use of the device here claimed and form no part thereof.

My improved device consists of a perforated body portion or disk 16 which if preferred may be struck from a sheet of metal, said stamping operation not only cutting the disk, but producing the perforations 17 and the projecting arms 18 at the one operation and in fact should it be found preferable the arms 18 may be bent into their upright position at said stamping operation and the device is ready for use.

It will of course be understood that the device may be made entirely or in part of wire mesh which may be stamped out and if necessary, bent into shape, thereby providing the same structure without the necessity of the perforating operation. Again the device may be constructed of any non-corrosive metal or glass, china or in fact any substance not liable to attack by the acids in the contents of the jar.

When the liquid and solid contents have been placed in a preserving jar, a part of the surface of the upper layer of fruit, projects above the liquid contents and when allowed to stand for any considerable length of time it will be found said exposed portion of the fruit has formed thereon a mold of fungus growth which renders said fruit uneatable. In many cases the solid contents of the jar or bag containing seasoning substances if permitted to become exposed above the liquid will destroy the entire contents of said jar. It is with the above facts in view that my improved device is provided in such form as to be useful with the ordinary form of fruit jar in universal use, and one in which no change will be necessary in the jar nor will it require any special construction of cap.

The device may be stamped out in several sizes suitable for use in different types of receptacles.

In use, after the jar is filled the device is placed on top of the contents and when the cap or other closure is seated into place the immersing plate or body portion owing to the contact between the upwardly projecting arms 18 and said closure will be forced down and with it the solids of the contents, beneath the level of the liquid contents and out of the reach of the deteriorating elements above the liquid line.

Having described my invention what I claim and desire to secure by Letters Patent is:—

An article of manufacture, an immerser for fruit jars struck from a single sheet of metal provided with a foraminous fruit depressing plate and vertically disposed resilient centering arms extending from the periphery of said plate and adapted for contact at their upper ends with the lid of the receptacle and the neck of the receptacle.

This specification signed and witnessed this 30th day of March, A. D. 1918.

R. J. BELER.

Witness:
    FRED B. FISHER.